INVENTOR.
CHARLES J. KINZIE
DONALD S. HAKE
BY Philip C. Reh
ATTORNEY

Aug. 8, 1939. C. J. KINZIE ET AL 2,168,603
METHOD OF MAKING ZIRCONIUM OXIDE
Filed Sept. 2, 1936 2 Sheets-Sheet 2

INVENTOR.
CHARLES J. KINZIE
DONALD S. HAKE
BY
ATTORNEY

Patented Aug. 8, 1939

REISSUED
FEB 25 1941

2,168,603

UNITED STATES PATENT OFFICE 2,168,603

METHOD OF MAKING ZIRCONIUM OXIDE

Charles J. Kinzie and Donald S. Hake, Niagara Falls, N. Y., assignors to The Titanium Alloy Manufacturing Company, New York, N. Y., a corporation of Maine Application September 2, 1936, Serial No. 99,030

14 Claims. (Cl. 23—24)

Our invention relates to the production of an improved anhydrous crystalline zirconium oxide, more particularly a new crystalline zirconium oxide of a high degree of purity and of exceptionally uniform particle size and other advantageous properties, in the electric resistance furnace with the incidental production of silicon carbide as a byproduct of the waste heat of the reaction.

We have now discovered that from zircon ($ZrSiO_4$) an anhydrous crystalline zirconium oxide can be made which, by virtue of its particular range of particle size, is unexpectedly capable of producing beneficial opaquing results in enamels and glazes not heretofore known in any zirconium oxide product.

We have also discovered that the basic reason for this new opacifying result resides in the particular sizes of the crystalline zirconium oxide particles, in that the maximum opacity is obtainable when the zirconium oxide particles are within the range 0.6 to 0.80 micron in size. Furthermore we have discovered that commercially practical opaquing results, well above those results obtainable with the heretofore known zirconium oxide products and well above the results derived by the use of the best grade tin oxide opacifiers, may be obtained, when the particle size of this zirconium oxide is within the range 0.40 micron to 1.50 microns.

We have additionally found that such zirconium oxide within the range 0.40 to 3 microns represents the outside limits, that is to say, there should not be many particles below 0.40 micron nor many above 3 microns in size, if the new high opacity results obtainable therefrom are to be maintained.

The foregoing discoveries are the result of our intensive researches with the high power microscope and camera coupled with standard procedure enameling tests. The instrument used for measuring the opacity of the enamel may be referred to as an opacimeter. There are a number of instruments on the market for such purpose differing more or less in principle, but all are apparently used to measure the same thing—opacity. Most of these instruments are called reflectance meters, reflectometers, etc., and although using one enameled plate, different instruments will vary a point or so in reading. This variation would also be applied to each of a series of opacifier tests and the net relative result would be the same.

Using these comparative opacifying methods, we have found that a zirconium oxide opacifier made according to the methods set forth in U. S. Patent No. 1,562,890 of November 24, 1925, or No. 1,588,476 of June 15, 1926 both to Kinzie, contain many zirconia crystals larger than 3 microns, some particles being as large as 8 microns in size. Such products yield opacity readings of 66 to 67, and although many attempts have been made by finer milling, it has not been found possible by milling procedures to reduce the particle size and increase the opacity.

In a pending application for patent made by one of us Serial No. 35,040 filed August 7, 1935, now Patent 2,102,627 issued Dec. 21, 1937, (Example "B"), a method is disclosed as to how the opacity of the starting $ZrO_2$ of either of the above Patents No. 1,562,890 and 1,588,476 could be materially improved. We now find that in the treatment described in said application Serial No. 35,040 the large zirconia particles are reduced in size during the roasting with $Na_2CO_3$ and $NaNO_3$; also that the product contains a few particles as small as 0.10 micron. A very few particles remain as large as 8 microns with the average size about 1 to 1.2 microns in size. Therefore in reducing the average particle size by roasting with alkali, the effect, although a desirable one, has produced some particles of no value as an opacifier, namely those under 0.40 micron, and also undesirably leaves a few particles larger than 3 microns which are only partially effective. If the roasting is prolonged, or if the roasted product is milled too long, the result would be that too many —0.40 micron particles are obtained and the resulting product, instead of having a reading of 72 in opacity, may be reduced very appreciably in opacity effects.

Substantially the same reasoning and results hold true in case of "Example C" in said application Serial No. 35,040. The starting zirconia particles are too large, but are in fact of a much more uniform large particle size than is the case of starting $ZrO_2$ in said "Example B". Therefore the roasting had a more uniform result, but still some particles that are too fine are obtained and also a few too coarse remain. Hence the net result is not as high an opacity as is obtainable when the starting $ZrO_2$ is more nearly in the final desired range of size.

In "Example D" of said application Serial No. 35,040, the starting $ZrO_2$ is initially of sufficient practical fineness. However, the amount of alkali used, we now find, was somewhat too large in amount and although the final result was an enamel having a reading of 75½, we now know that in this "Example D", if the roasting with the amount of alkali were prolonged as is liable to occur in practice due to parts of charge becoming too hot in attempts to bring the whole to the desired temperature, etc., there can easily result a formation of many particles under 0.40 micron in size with resultant loss in opaquing effect, as hereinbefore explained.

The accompanying drawings show a type of an electric resistance furnace in which our invention may be practiced.

Figure 1:
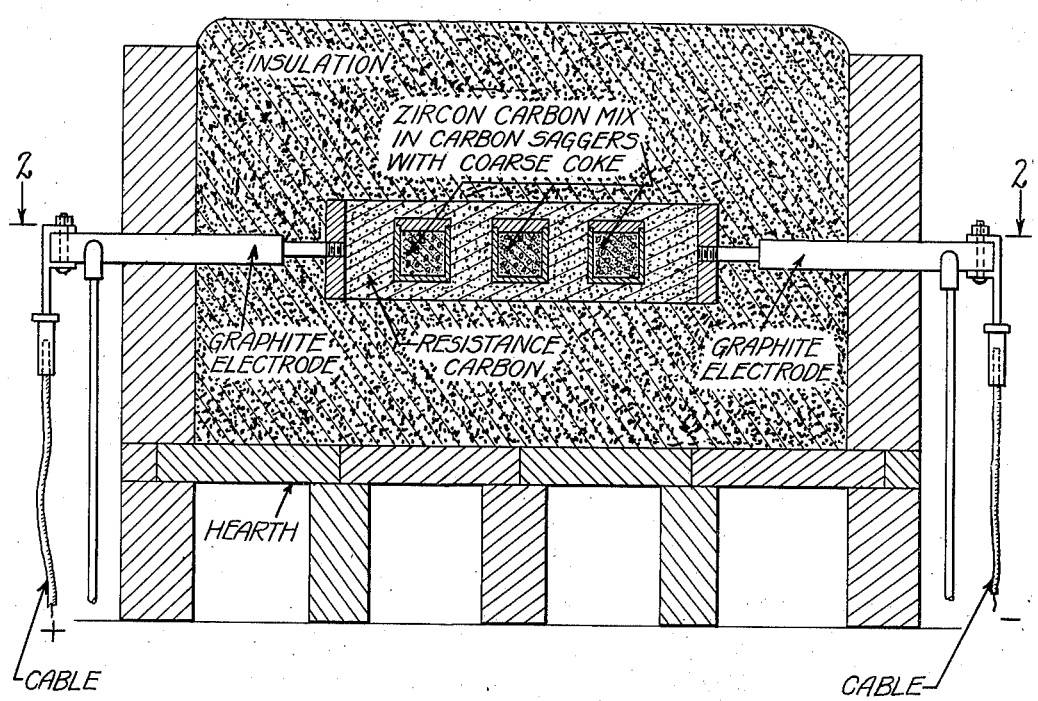
Fig. 1 is a sectional elevation of the furnace and its contents.
Figure 2:
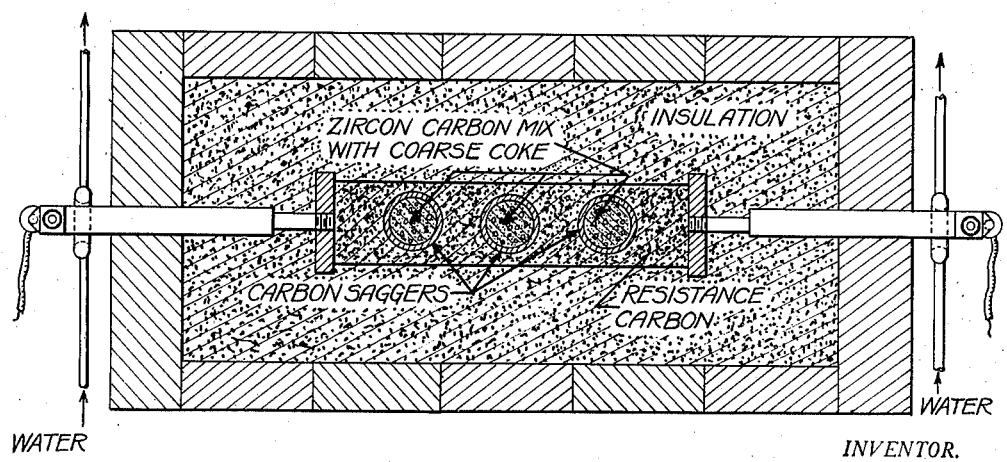
Fig. 2 is a horizontal section taken on the line 2—2 of Fig. 1.
Figure 3:
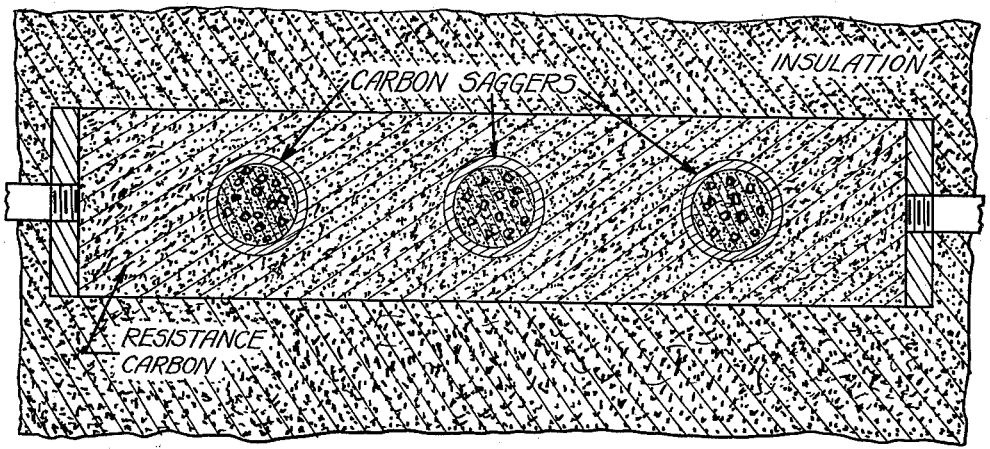
Fig. 3 is an enlarged section of what is illustrated in Fig. 2 to show a preferred method of loading.
Figure 4:
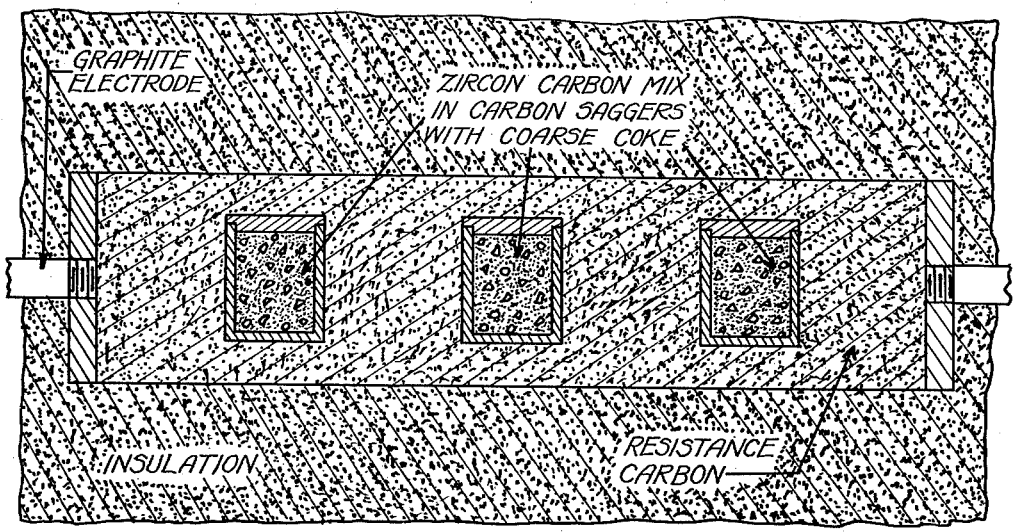
Fig. 4 is an enlarged horizontal section of what is illustrated in Fig. 1 to show a preferred method of loading.

Referring to these Figs. 1 and 2, the hearth of any suitable material is supported on piers, the hearth forming a supporting base for the furnace and its charge. Such base has also side and end walls to hold the charge. Through each of the end walls is a suitable opening for arranging the graphite electrodes, while the sidewalls of the furnace are built up of loose bricks to permit the free escape of evolved gases.

Outside the furnace the ends of the graphite electrodes may be cooled by passing a current of water through them as shown in Figs. 1 and 2.

Therefore our present invention is based upon our discoveries that not only the particle sizes within the specified ranges are essential for high opaquing effects, but also as equally important that in order to constitute effective opacifiers, the anhydrous crystals of zirconium oxide of proper particle size must be free to act as separate entities and not as aggregates of particles.

Our invention is based primarily on our discoveries resulting from researches into factors influencing the production of zirconium oxide as separate non-agglomerated crystals having particle sizes in the range of 0.4 to 3 microns, with the majority of particles in range of 0.6 to 0.80 micron in size and also showing practically no agglomeration.

Extensive researches covering many variations in proportions, treatment in furnace, etc. have led us to the following conclusions:

(A) That zirconium silicate ($ZrSiO_4$) in proper admixture with carbon could be made to yield an essentially silicon-free zirconium compound from which free separate crystals of $ZrO_2$ of the desired particle size could be made, and that by processing according to either of our alternative methods, the silicon carbide could be made to separate from the Zirconium compound.

(B) An important part of our improved methods is in our relatively fine carbon (petroleum coke) —80 mesh, that is intimately mixed with the granules of $ZrSiO_4$, most of which were also in size —80 mesh since the carbon and zircon when treated should be of about the same particle size.

(C) Another important feature of our invention is the proportion of petroleum coke to zircon. 25 parts by weight of —80 mesh petroleum coke to 100 parts by weight of zircon is preferred. We have found that if much less coke is used, there is formed in proportion to the lowered coke content an increasing amount of zirconium oxide in the form of undesirable large crystals, more or less like the synthetic baddeleyite. For example, a mixture of 100 parts of zircon and 18 parts of coke will show very definite amounts of synthetic baddeleyite aggregates on the screen along with SiC aggregates. Such formation is undesired, since the synthetic baddeleyite does not yield the desired opacifier product, even if it could be separated from the SiC. On the other hand, if the amount of fine coke is increased, the surplusage is consumed to form SiC in small separate crystals which can not be readily separated from the desired zirconium compound.

(D) Our discovery that by adding to the mixture of 100 parts of zircon and 25 parts of fine coke, 25 parts of petroleum coke between $\frac{1}{10}''$ and $\frac{1}{4}''$ in size, preferably $\frac{1}{8}''$, these coke pieces serve as absorbing zones for the silicon compound which completely leaves the zirconium. The silicon forms silicon carbide crystals as aggregates, which remain more or less of the original coarse coke size. It is thus possible by coarse sieving initially to remove most of the SiC from the zirconium compound.

(E) By sieving to —40 mesh the sagger discharge, the zirconium-carbon complex is almost completely separated from the SiC, the latter remaining on the sieve. Since the zirconium compound formed must be ultimately calcined in an oxidizing atmosphere to $ZrO_2$, such calcination may be done by heating the entire discharge derived from saggers. The granular zirconium-carbon compound is thereby converted to the desired $ZrO_2$ product, while the SiC remains unaltered in the form of relatively large crystals, and may be removed by any suitable means, such as screening, flotation, tabling, air separation; we have used sieving with good success.

(F) The temperature in the charge during the electric resistance furnace operation should be kept well below the decomposition point of the silicon carbide. We have found a temperature between 1800–2000° C. is best, preferably around 1800° C., or as low as possible in order to produce the desired $ZrO_2$ product. If the temperature goes too high, fully formed zirconium carbide results, which yields undesired large crystals of $ZrO_2$ upon calcination.

(G) Where a very low SiC containing $ZrO_2$ is desired, we have found that such product may be produced by first placing a layer of $\frac{1}{8}''$ coke inside the sagger walls, and then inserting therein the 100:25 mix of —80 mesh zircon and —80 mesh coke followed by heating, etc. In this way the SiC forms an inner wall in the sagger due the fact the silicon completely leaves the Zr zone, and the granular zirconium compound is easily removed and calcined to a cream white product with but a trace of SiC. For practical reasons of operation we prefer the first method, since it yields commercially practical results with less work.

(H) The zirconium oxide produced by the calcination of the zirconium-carbon-oxygen complex, even if completely free of SiC and although producing a very high opacity enamel (readings of 80 being obtained), are poor in texture and lustre due to the fact that tenaciously held adsorbed gases are evolved in the enamel firing which, even in a 2½ enamel firing causes a bloating of the enamel film, thereby increasing its thickness as a result of the evolution of a multitude of gas bubbles. For enamel and glazing opacifier purposes, it is important to overcome this defect, since if, as is normally the case, a little SiC remains with the $ZrO_2$, the former must be eliminated before the $ZrO_2$ can be successfully used in enameling work.

This procedure we prefer to do generally as set forth in said application Serial No. 35,040 with the following important exception. We have now found that, with zirconium oxides in the range of 0.4 to 1 micron or thereabouts, if the amount of $Na_2CO_3$, $NaNO_3$ is as proposed in said application Serial No. 35,040, and the roasting is not done with extreme care, the result will be the breaking up of the suitably sized $ZrO_2$ particles into too fine particles (below 0.40 micron) with a definite loss in opaquing effects. For example, a zirconium oxide of this type, that is roasted 100 parts with 10 parts $Na_2CO_3$ and 2½ parts $NaNO_3$, 5 hours at 950° C., and then wet-milled a few hours, then washed with water to remove surplus soda, and dried, yielded by standard enamel procedure a reading of only 68. Our examination showed that too many of the particles have passed under the lower 0.40 micron limit.

In order to avoid the undesired reduction in particle size, we have found it particularly advantageous to use definitely less $Na_2CO_3$, and also to heat only long enough and only high enough to accomplish the elimination of the adsorbed gases with the decomposition of any SiC present. We carefully avoid any condition in roasting which would unduly reduce an already proper particle size, since if the fineness is right at this point, any milling to extend the actual particle size reduction should be avoided. In most cases a simple stirring of the roast with water is sufficient, or else a very short controlled milling, or rather a wet disintegration only to the point of loosening up the mild state of aggregation due to roasting.

The following examples will show how our improved methods may be practiced to obtain our novel and improved anhydrous crystalline zirconium oxide.

*Example No. 1*

Zirconium silicate in granular form and previously purified so as to contain less than 0.01% $TiO_2$, and less than 0.01% $Fe_2O_3$ with only traces of other impurities is preferably used, although less pure $ZrSiO_4$ can be used if the requirements of the end product will permit. The $ZrSiO_4$ should all pass a 35 mesh screen, and more than 80 per cent will be —80 mesh with but a per cent or so finer than 325 mesh. Petroleum coke is used that contains approximately

| | Per cent |
|---|---|
| Fixed carbon | 85–90 |
| Volatile matter | 8 |
| Ash | 0.25 |

This coke is ground so as to pass an 80 mesh sieve.

A mixture is then made consisting of—

| | Parts by weight |
|---|---|
| Zirconium silicate | 100 |
| Petroleum coke —80 mesh | 25 |

To this mixture are added 25 parts by weight of coarse petroleum coke $\frac{1}{16}''$ to $\frac{1}{4}''$, but preferably as close to $\frac{1}{8}''$ size as possible, and the whole charge is intimately mixed. Each of the three carbon saggers shown in Figs. 1 and 2 is filled with the charge, and then placed in the core of resistance furnace as illustrated in Figs. 1 and 2. The power input, period of the run, etc., will of course vary with the size of the saggers, furnace type, etc., but the temperature and time under heat should be such as only to decompose the zircon, convert its zirconium into a zirconium-carbon-oxygen complex, and allow the silicon compounds to be fully converted to silicon carbide by absorption within the coarse carbon pieces. But we avoid such an excess of heat or its duration as would tend to fully form zirconium carbide.

Under these described conditions, the charge upon cooling will consist of two phases—one a zirconium-carbon-oxygen compound or coherent granular zirconium carboxide and aggregates of SiC crystals in the places where pieces of coarse coke were formerly located.

By screening the cooled sagger discharge through a 40 mesh sieve, two portions were obtained composed substantially of

| | Per cent |
|---|---|
| SiC plus residual coke | 30 |
| Granular zirconium carboxide | 70 |

The 70% —40 mesh zirconium compound contained approximately—

| | Per cent |
|---|---|
| Zr | 79.00 |
| Ti | 0.01 |
| SiC | 2.00 |
| Fe | 0.01 |
| C | 10.00 |
| Oxygen | 8.98 |
| | 100.00 |

The 30% SiC plus C would actually contain about ⅔ its weight of SiC, as some surplus of carbon is desirable. From this product crystals of SiC may be obtained by igniting to oxidize the free carbon, crushing, washing, etc. to produce grains of SiC.

The improved zirconium oxide is produced from the —40 mesh zirconium compound product by ignition in air and cooling. This product is a fairly clean cream-white powder. By feeding the powder into a stream of air and collecting in a dust chamber, any loose aggregates are freed, and the resulting product may then be obtained by suitable lawning (—325 mesh), or by any suitable gravity separation method, air classification, floatation, etc., so as to be essentially free of SiC.

Typical zirconium oxide products thus produced contain approximately:

| | Per cent |
|---|---|
| $ZrO_2$ + adsorbed gas | 98.80 |
| $TiO_2$ | 0.02 |
| $Fe_2O_3$ | 0.01 |
| SiC | 0.40 |
| $Al_2O_3$ | 0.30 |
| Rare earths | 0.20 |
| Others | 0.27 |
| | 100.00 |

This product is then converted to a zirconium oxide opacifier by freeing it of adsorbed gases and SiC by intimately mixing a charge comprised of 100 parts of this $ZrO_2$ product with 3 parts of $Na_2CO_3$ and 2 parts of $NaNO_3$ (parts by weight).

This intimately-contacted mixture is then roasted only long enough and at such a temperature as to decompose completely the SiC and also eliminate the adsorbed gases. A temperature of about 900° C. in a layer of say 1" of charge we found advantageous, and only prolonged enough to accomplish the required results.

The roasted product will have approximately the following composition—

| | Per cent |
|---|---|
| Zirconium oxide ($ZrO_2$) | 96.99 |
| Sodium ($Na_2O$) | 2.46 |
| Silica ($SiO_2$) | 0.30 |
| Others | 0.25 |
| | 100.00 |

This zirconium oxide consists of crystallized $ZrO_2$ particles within the range of 0.40 micron to 1.50 microns as we have hereinbefore described, the greater part being close to one micron in size.

Such zirconium oxide product, when used directly at the mill in standard enameling procedure, will produce a highly lustrous white enamel having an opacity reading of about 77, thereby showing a vastly superior result when compared with the best tin oxide that has a 71½ reading.

In fact, this superior result by the use of this high opacity zirconium oxide with only about 3 to 4 per cent of $ZrO_2$ has according to our tests produced opacity equal to 6 per cent of tin oxide, whereas all published references based on comparisons of known zirconium oxides and high grade tin oxide conclude that from 1¼ to 1½ pounds of $ZrO_2$ must be used to produce an opacity equal to one pound of such tin oxide, up to the time of our discoveries hereinbefore described as to the proper particle size of our improved $ZrO_2$ products.

Since such high opacity zirconium oxide products may be used in fairly large mill additions, it will follow that with superopaque enamel frits, having without mill addition opacifiers a reading of say 80, these frits can be brought practically up to theoretical complete hiding by the use, say from 5 to 10 per cent, of this new $ZrO_2$ material. Hence the important result follows that to produce the opacity considered as standard in enamel requirement, a very thin coating can be used, whereby the usual coating of from 55 to 72 grams per sq. ft. can be reduced to 30 to 40 grams per sq. ft. with important economies to the trade and vastly improved resistance to chipping, etc. as result of such thin coatings.

*Example No. 2*

Figure 5:
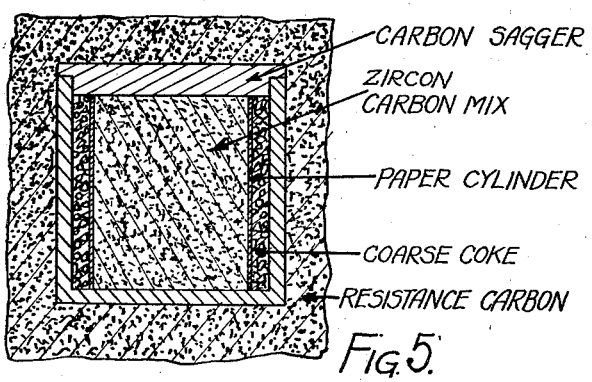
Fig. 5 is an enlarged detail vertical section showing a modified method of loading the saggers.

This procedure differs from Example No. 1 only to the extent that inside each sagger is placed a cylinder of thin paper as shown in Fig. 5, just strong enough to support a $\frac{3}{16}''$ layer of $\frac{1}{10}''$ petroleum coke inside the sagger wall. With the paper in place and the coarse coke charged, the mixture of 100 parts zircon sand and 25 parts —80 mesh coke is then arranged to fill the space inside the paper cylinder. The carbon covers are put on and the three saggers are then placed in the core of the furnace and the run made as in Example No. 1.

The granular zirconium carboxide may then be removed entirely free from the SiC which now has been formed as a lining. The zirconium carboxide compound upon calcination yields a pure $ZrO_2$ which under best conditions is free of SiC, without recourse to lawning. The SiC is then readily detached from the sagger and any free carbon removed by ignition and the SiC may be recovered.

The $ZrO_2$ product may then be converted to the high opacity and high lustre $ZrO_2$ opacifier as already described in Example No. 1.

In either Example No. 1 or Example No. 2, the zirconium oxide may be converted to a high lustre high opacity product by the halogen gas (chlorine) treatment, if desired, according to the methods set forth in the pending C. J. Kinzie application for patent filed June 22, 1935, Serial No. 27,869.

We claim as our invention:

1. The method of making anhydrous crystalline zirconium oxide from zirconium silicate or zircon, which comprises placing a mixture of finely-divided zircon and carbon in proportions of about 4 to 1 in which mixture are contained larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

2. The method of making anhydrous crystalline zirconium oxide from zirconium silicate or finely-divided zircon, which comprises placing an intimate mixture of zircon and carbon in proportions of about 4 to 1 and of substantially the same particle size in which mixture are contained larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

3. The method of making anhydrous crystalline zirconium oxide from zirconium silicate or zircon, which comprises placing an intimate mixture of finely-divided zircon and finely-divided carbon in proportions of about 4 to 1 mixed with particles of coarser coke in the proportion of zircon to coarser coke of about 4 to 1 forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

4. The method of making anhydrous crystalline zirconium oxide from zirconium silicate or zircon, which comprises placing a mixture of finely-divided zircon and carbon in proportions of about 4 to 1 in which mixture are contained larger particles of coarse coke forming the charge within a carbon container surrounded by resistance carbon acting substantially as the heat-producing resistor, but substantially mechanically separated therefrom, then heating said separated charge in an electric resistance furnace between 1800° and 2000° C. by heat mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

5. The method of making an anhydrous crystalline zirconium oxide pure white in color and of particle size ranging chiefly between 0.40 and 3 microns from zirconium silicate or zircon, which comprises placing a mixture of finely-divided zircon and carbon, both of substantially the same particle size, in which mixture are contained larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, separating therefrom the silicon carbide crystal aggregates, and then roasting the zirconium oxide mixed with a relatively small amount of an alkali-metal reagent between 800° and 950° C.

6. The method of making an anhydrous crystalline zirconium oxide pure white in color and of particle size ranging chiefly between 0.40 and 3 microns from zirconium silicate or zircon, which comprises placing an intimate mixture of finely-divided zircon and carbon both of substantially the same particle size in proportions of about 4 to 1 and mixed with larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, separating therefrom the silicon carbide crystal aggregates, then roasting the zirconium oxide mixed with a relatively small amount of an alkali-metal reagent between 800° and 950° C., and then water-washing the roast to remove soluble compounds from the resulting crystalline zirconium oxide.

7. The method of making an anhydrous crystalline zirconium oxide pure white in color and of particle size ranging chiefly between 0.40 and 3 microns from zirconium silicate or zircon, which comprises placing a mixture of finely-divided zircon and carbon both of substantially the same particle size in proportions of about 4 to 1 mixed with particles of coarser coke in proportions of about 4 of zircon to 1 of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, separating therefrom the silicon carbide crystal aggregates, and then roasting the zirconium oxide mixed with not more than 5% of an alkali-metal reagent between 800° and 950° C.

8. In the method of making anhydrous crystalline zirconium oxide of particle size ranging chiefly between 0.40 and 3 microns and substantially free from agglomerations by the thermal decomposition, but without fusion, of a mixture of zirconium silicate or zircon and lesser amounts of carbon to yield an essentially silicon-free zirconium-carbon-oxygen complex and silicon carbide, the steps which consist in separating said silicon carbide from said complex, then calcining the latter to form a zirconium oxide product, and finally roasting said zirconium oxide containing occluded gases mixed with sodium carbonate and sodium nitrate in a ratio of about 5 parts of said sodium compounds to 100 parts of said zirconium compound between 800° and 950° C. until any residual silicon carbide has been decomposed and the gases eliminated.

9. In the method of making anhydrous crystalline zirconium oxide from zirconium silicate or zircon, the steps which consist in placing a mixture of finely-divided zircon and carbon both of substantially the same particle size in proportions of about 4 to 1 in which mixture are incorporated larger particles of coarse coke in proportions of about 4 of zircon to 1 of coke forming the charge within a carbon container surrounded by resistance carbon acting substantially as the heat-producing resistor, but substantially mechanically separated therefrom, and then heating said separated charge in an electric resistance furnace by temperatures mainly developed in the resistor surrounding the charge without fusion, but with substantial decomposition of the charge to yield a separable mixture of an essentially silicon-free zirconium-carbon-oxygen complex and separable silicon carbide crystal aggregates absorbed within the coke.

10. In the method of making anhydrous crystalline zirconium oxide from zirconium silicate or zircon, the steps which consist in placing a mixture of finely-divided zircon and carbon in the proportion of about 4 to 1, both being of substantially the same particle size, in which mixture are incorporated larger particles of coarse coke forming the charge within a carbon container surrounded by resistance carbon acting substantially as the heat-producing resistor, but substantially mechanically separated therefrom, and then heating said separated charge in an electric resistance furnace by temperatures mainly developed in the resistor surrounding the charge without fusion, but with substantial decomposition of the charge to yield a separable mixture of an essentially silicon-free zirconium-carbon-oxygen complex and separable silicon carbide crystal aggregates absorbed within the coke.

11. The method of making an anhydrous crystalline zirconium oxide pure white in color and of particle size ranging chiefly between 0.40 and 3 microns from zirconium silicate containing a fractional percentage of titanium and iron with other impurities, which comprises placing an intimate, finely-divided mixture of said zirconium silicate and carbon both of substantially the same particle size and in proportions of about 4 to 1 in which mixture are incorporated larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and to convert the silicon compounds to separable silicon carbide crystal aggregates absorbed within the coke, calcining the mass under oxidizing conditions, separating therefrom the silicon carbide crystal aggregates, and then roasting the zirconium oxide material mixed with an alkali-metal reagent in a ratio of about 5 parts of said reagent to 100 parts of said zirconium compound to decompose any residual silicon carbide and eliminate adsorbed gases to form said anhydrous crystalline zirconium oxide.

12. The method of making anhydrous crystalline zirconium oxide from zirconium silicate or zircon, which comprises placing a mixture of finely-divided zircon and carbon in proportions of about 4 to 1 in which mixture are contained larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, separating the silicon carbide crystal aggregates from the said zirconium-carbon-oxygen complex, and calcining the latter under oxidizing conditions to produce said anhydrous crystalline zirconium oxide.

13. The method of making anhydrous crystalline zirconium oxide from zirconium silicate or zircon, which comprises placing an intimate mixture of finely-divided zircon and carbon in proportions of about 4 to 1 and of substantially the same particle size in which mixture are contained larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, separating the silicon carbide crystal aggregates from the said zirconium-carbon-oxygen complex, and calcining the latter under oxidizing conditions to produce said anhydrous crystalline zirconium oxide.

14. The method of making anhydrous crystalline zirconium oxide from zirconium silicate or zircon, which comprises placing an intimate mixture of finely-divided zircon and carbon in proportions of about 4 to 1 and of substantially the same particle size and mixed with larger particles of coarse coke forming the charge within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, separating the silicon carbide crystal aggregates from the said zirconium-carbon-oxygen complex, and calcining the latter under oxidizing conditions to produce said anhydrous crystalline zirconium oxide.

CHARLES J. KINZIE.
DONALD S. HAKE.